July 24, 1962 H. MIEDEMA 3,046,347

TRANSMISSION CONTROL IN A TWO WAY COMMUNICATION SYSTEM

Filed Feb. 25, 1959 2 Sheets-Sheet 1

INVENTOR
H. MIEDEMA
BY Harry C. Hart
ATTORNEY

TRANSMISSION CONTROL IN A TWO WAY COMMUNICATION SYSTEM

Filed Feb. 25, 1959 2 Sheets-Sheet 2

INVENTOR
H. MIEDEMA
BY Harry C. Hart
ATTORNEY

United States Patent Office 3,046,347
Patented July 24, 1962

3,046,347

TRANSMISSION CONTROL IN A TWO WAY COMMUNICATION SYSTEM

Hotze Miedema, Mendham, N.J., assignor to Bell Telephone Laboratories, Incorporated, New York, N.Y., a corporation of New York Filed Feb. 25, 1959, Ser. No. 795,525
13 Claims. (Cl. 179—15)

This invention deals with voice communication systems and, more particularly, with systems in which significant parts of the speech signals of a plurality of talkers are interleaved and transmitted on a lesser plurality of communication channels.

The most efficient use of transmission facilities occurs when full use of all of the available channel time is made. One means of making the maximum use of channel time is to employ a time assignment speech interpolation system, commonly know nas TASI. Such systems are well known in the art, being disclosed, for example, in the patent application of F. A. Saal and I. Welber, Serial No. 686,468, filed September 26, 1957, issued May 3, 1960, as Patent No. 2,935,569.

A telephone conversation uses transmission facilities in one direction, on the average, for less than one third of the time. TASI turns this statistical fact to account by providing a talker with a channel only during those periods when the talker is generating speech energy above some preselected level.

For the purpose of TASI, speech may be considered to be a series of talk spurts, a talk spurt being an elementary unit of speech during which speech energy is present continuously. In a TASI system, each signal source or talker substation is monitored by a speech detector which generates an output pulse in response to each talk spurt from its associated talker. Each output pulse corresponds to an increment of time during which the magnitude or volume of the talk spurt is sufficient to overcome the designed threshold of the detector. The output signal from each detector in a system is applied to control apparatus which in turn transmits an operating signal to a TASI switch that functions in response to such a signal to connect the corresponding active talker with an idle channel.

Since a speech detector is an amplitude sensitive device, it is subject to false operation by both noise and echoes which, in a TASI system, causes a corresponding false operation of the TASI switch. The resulting connection of a talker substation to a transmission channel during periods when a channel is not in fact required is one of the most critical problems encountered in the operation of TASI apparatus. In the prior art, arrangements designed to meet this problem have attempted to distinguish between speech and noise on the basis of average differences in amplitude and between speech and echoes by the use of echo suppressors. Such systems fail to exploit fully the theoretical efficiency of TASI apparatus since no protection against relatively large amplitude noise spurts is provided and echo suppressors are only partially effective in meeting the stringent requirements of a TASI system.

Accordingly, one general object of this invention is to improve the efficiency of voice communication systems.

A more specific object of this invention is to provide communication channel-sharing apparatus that effectively distinguishes between noise and speech signals.

A further object of this invention is to reduce the false operation of speech detectors by noise and echoes.

It is known that, on an average, the duration of spurts of noise energy in a voice communication system which exceed a preselected amplitude is substantially less than the duration of speech spurts which occur above the same preselected amplitude. The stated objects of the invention, together with additional objects, are achieved by employing a unique combination of apparatus that distinguishes between noise and speech on the basis of signal duration together with additional apparatus that supplements the echo-defeating feature of a conventional echo suppressor.

In a specific embodiment of the invention a first and a second speech detector in parallel configuration are employed in lieu of the single speech detector found in conventional systems. Additionally, a delay network is provided on the input side of the first speech detector. Hence, each output pulse from the first speech detector is delayed by a preselected increment of time as compared to the corresponding output pulse from the second speech detector. In a particular illustrative embodiment of the invention these outputs are in turn applied to an AND gate.

The period of the time delay introduced on the input side of the first speech detector is selected uniquely in accordance with the invention to be slightly longer than the duration of the average noise spurts which reach the speech detectors as inputs, and hence, in general, each noise-stimulated output pulse from the first speech detector has its trailing edge separated in time from the leading edge of the corresponding pulse from the second speech detector. Stated otherwise, a noise spurt produces no overlap in time between the two corresponding output pulses from the speech detectors. On the other hand, the duration of an average speech spurt input to the speech detectors is sufficient to ensure an overlap in time between the corresponding output pulses. Consequently, noise and speech can be distinguished readily, in accordance with the invention, by applying the speech detector outputs to a device whose output is responsive to overlapping input signals. As noted above, an AND gate may be employed advantageously to perform this function.

In an arrangement employing an AND gate, as described, the duration of the AND gate outputs necessarily reflects the duration of overlap between the input pulses rather than the actual duration of the speech spurt that the pulses represent. Consequently, if these pulses were employed to control the operation of the TASI switch each speech spurt output from the TASI switch would be clipped initially, terminally, or both, by an amount corresponding to the delay introduced on the input side of the first speech detector. In accordance with the inven tion, such clipping is avoided uniquely by providing a feedback path between the AND gate output and a pulse-prolonging device or pulse stretcher on the output side of the second or non-delayed speech detector in order to prolong the output pulse until the termination of the output from the first or delayed speech detector and further by delaying the speech input to the TASI switch by an interval equal to the time delay of the first speech detector.

Conventionally, a speech detector is designed to produce an output signal whose duration exceeds the duration of the corresponding input signal by some preselected increment of time. This time increment is commonly referred to as "hangover." The employment of hangover serves to furnish a talker with a transmission channel for a brief period after his speech spurt no longer exceeds the threshold of his speech detector. As a result, the line is kept open for the transmission of the tails of speech spurts which would otherwise be clipped. In an arrangement in accordance with the invention, however, the hangover of the speech detectors is kept to a minimum since prolonging the duration of both speech detector outputs would reduce the ability of the apparatus to distinguish between noise and speech on the basis of signal duration. In accordance with the invention, the need for hangover is met by applying the output of the AND gate to a separate hangover device which may be, for example, a gate pulse generator.

In accordance with another aspect of the invention, a third speech detector is employed to ensure against the false operation of the TASI switch by echoes. Specifically, a speech path is provided from a point on the receiving line to a first gate circuit. The output of the gate circuit is applied to the third speech detector and the output of the third speech detector is in turn applied to a second gate circuit in the input path of the second speech detector. Speech or echoes on the receiving line inhibit the operation of the second gate which, in effect, prevents such signals from falsely operating the TASI switch. This aspect of the invention is further cooperatively related to the circuitry employed to distinguish between speech and noise in that the output of the hangover device or gate pulse generator is also applied to inhibit the first speech gate which in effect disables the third speech detector whenever speech signals are present on the transmitting line.

The circuit including the third speech detector is also cooperatively related to the operation of a conventional echo suppressor which is bridged across the talking and receiving lines. Specifically, the tap from the receiving line which leads to the first gate circuit is taken from a point on the near end talker's side of the echo suppressor so that only echoes which may fail, for various reasons, to operate the echo suppressor act to inhibit the second speech gate. Consequently, there is no interference with normal echo suppressor operation.

Accordingly, one feature of the invention is an arrangement which distinguishes between speech spurts and noise spurts on the basis of the respective durations of those spurts.

Another feature of the invention is a particular combination of circuits which affords protection against the false operation of a speech detector by echoes and noise.

A further feature of the invention is the employment of a speech detector to supplement the action of an echo suppressor.

The invention, together with additional objects and features thereof, will be fully apprehended from a consideration of the following detailed description and accompanying drawing of a particular embodiment, in which.

Figure 1:
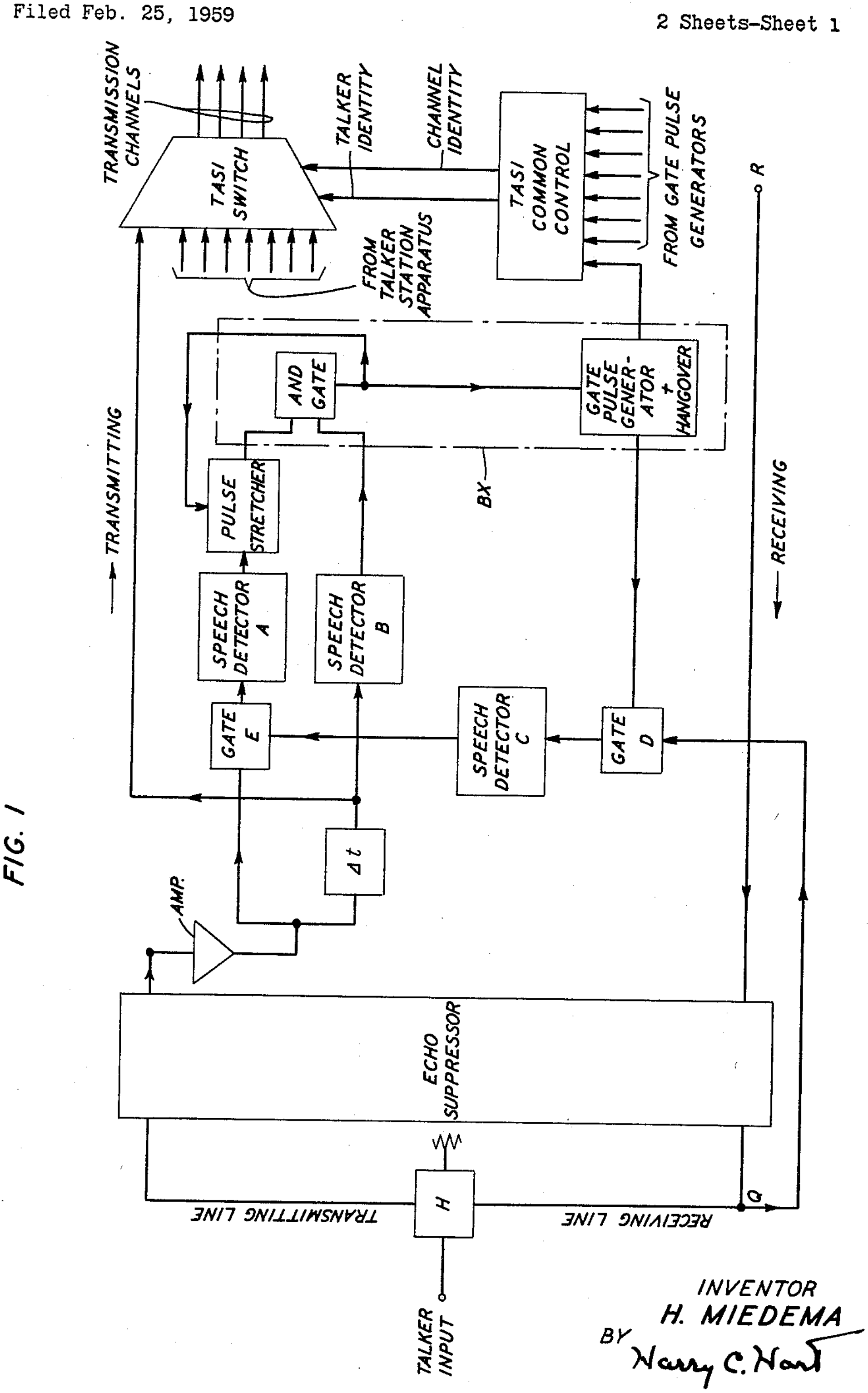
FIG. 1 is a block diagram of a part of a TASI system in accordance with the invention.

The operation of the embodiment shown in FIG. 1 may be demonstrated conveniently by tracing the course of an input speech signal. Additionally, occasional reference to FIG. 3 will aid the reader in connecting each of the waveforms shown with a respective associated point in the circuit of FIG. 1. Commencing at the talker input point, a speech signal is applied to the hybrid circuit H which may be of conventional form. The signal is then fed to the transmitting line through an echo suppressor. Echo suppressors are well known in the art and function to insert a relatively high impedance between a talker and his receiving line at a preselected time after the talker begins transmitting so that speech energy which might be reflected in the form of echoes from the far end is blocked before reaching the hybrid coil. Similarly, speech signals on the receiving line which exceed a particular level operate the echo suppressor so that after a suitable time interval a high impedance is inserted in the transmitting line. Such devices are shown, for example, in Patent 1,545,558 which issued July 14, 1925, to H. S. Hamilton and S. B. Wright.

For the purpose of the present discussion, a low impedance path between the hybrid circuit H and the transmitting line may be assumed. As shown, the output of the speech detector is applied as an input to an amplifier and, in turn, the output of the amplifier is fed to parallel paths, the first including a speech gate E, which for the moment we may assume is a closed low impedance path, and a speech detector A. The second parallel path includes a delay network $\Delta T$ which may be of conventional form, for example a capacitance-inductance-capacitance $\pi$ network, and a second speech detector B.

Figure 3:
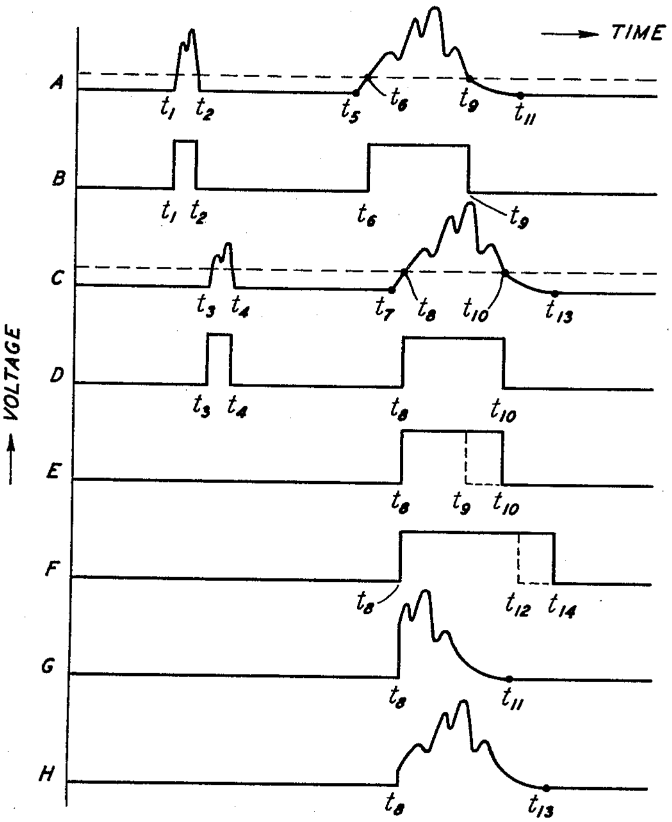
FIG. 3 is a group of waveforms tracing the operation of the circuitry shown in FIGS. 1 and 2.

Turning now to FIG. 3, curve A illustrates a typical output of the amplifier of FIG. 1. The first signal extending from time $t1$ to $t2$ is a noise spurt, amplifier noise for example, and the second signal, $t5$ to $t11$, is a speech spurt from the talker input point. At the input point of speech detector B both the noise spurt and speech spurt have been delayed by the delay network $\Delta T$ as shown in curve C of FIG. 3. Specifically, the delay introduced is shown by the interval $t1$—$t3$ or by the equal interval $t5$—$t7$. The output of speech detector A is shown by curve B, namely, the pulse $t1$—$t2$ representing the noise spurt and the pulse $t6$—$t9$ representing the speech spurt. It may be observed that the duration of the speech detector output pulse corresponding to the speech spurt has a duration less than $t5$—$t11$ since characteristically a speech detector is designed with a particular threshold so that an output signal is produced only during such time that the input signal exceeds that threshold. The threshold of speech detector A is illustrated by the dashed line in curve A and the sensitivity of speech detector B is similarly illustrated in curve C. The output of speech detector B is illustrated by curve D of FIG. 3 with the pulse corresponding to the noise spurt shown as $t3$—$t4$ and the pulse corresponding to the speech spurt shown as $t8$—$t10$.

The outputs from speech detectors A and B are next fed to an AND gate the output of speech detector A being applied through a pulse stretcher. Since there is no overlapping in time between pulse $t1$—$t2$ and pulse $t3$—$t4$, the AND gate, functioning conventionally, produces no output corresponding to the noise spurt. With respect to the two pulses representing the speech spurt, however, an overlap in time occurs so that an output pulse $t8$—$t9$ as shown in curve E may be produced. The pulse $t8$—$t9$ is not in fact used, however, as indicated by its dotted trailing edge, since it is obvious that the pulse does not accurately reflect the duration of that part of the speech spurt $t6$—$t9$ or $t8$—$t10$ which exceeds the thresholds of the respective speech detectors. In accordance with the invention, as shown in FIG. 1, a feedback path between the output point of the AND gate and the pulse stretcher is employed in order to prolong the duration of the output pulse of speech detector A by the time interval $\Delta t$, or until time $t10$ which corresponds to the termination of the output of speech detector B. The pulse stretcher in the particular embodiment shown is a substantially conventional hangover circuit which may be readily adapted by persons skilled in the art to be responsive to feedback from the AND gate output. This arrangement, however, is in contrast to a fully conventional hangover circuit which is normally a built-in feature of the speech detector and which does not employ the stimulus of a feedback signal for its operation.

The term "hangover" has been employed up to this point to describe the lengthening of the non-delayed speech detector output which serves to increase the duration of the AND gate output until it equals the duration of the speech spurt. However, hangover in the conventional sense is also required, that is to say an effective extension of speech detector output or, more precisely, AND gate output, beyond the duration of the corresponding speech spurt in order to avoid terminal clipping. In a circuit in accordance with the invention, hangover cannot be applied to both speech detectors since it would merely cause overlapping between the output pulses corresponding to a noise spurt, thus making it impossible to distinguish between noise and speech on the basis of signal length. Instead, in accordance with the invention, hangover is provided between the AND gate and the TASI common control. Hangover at that point may be introduced in a number of ways, for example, by a pulse stretching circuit or by the conventional device shown in FIG. 1, a gate pulse generator. The output pulse of the gate pulse generator is shown in curve F of FIG. 3, the pulse extending from time $t8$ to $t12$ when no feedback circuit is provided around the AND gate, or from $t8$ to $t14$ with a feedback circuit. Accordingly, hangover time is represented by the period $t9$—$t12$ or $t10$—$t14$.

The output of the gate pulse generator is applied to a TASI common control unit. Additionally, leads representing all the other gate pulse generator outputs in the system are shown connected to the TASI common control unit. TASI common control units are well known in the art and are shown, for example, in the F. A. Saal-I. Welber application cited above. In general, the function of a TASI common control unit is to scan each detector line periodically to determine the degree of output activity from each speech detector or, as shown in FIG. 1, from each gate pulse generator. Additionally, the common control includes a memory device which retains a current record of line-transmission channel connections. The common control output which is applied to the TASI switch comprises one signal to identify a particular talker and a second signal to identify a particular channel.

Input points at the TASI switch also include connections for all of the talker stations in the system. Output lines from the switch are transmission channels. While an approximate two-to-one ratio of talker stations to transmission channels is conventional, the number of each is normally substantially greater than shown in FIG. 1. In its operation, the TASI switch responds to the common control signals by connecting the appropriate talker line to an idle transmission channel. The output of the TASI switch is, of course, a series of speech spurts with the duration of each spurt corresponding to the duration of the associated output pulse from the gate pulse generator.

While it is necessary to have the AND gate output pulse and the associated common control output signal accurately reflect the duration of the speech spurt that is to be transmitted, it is equally essential to have the speech signal and its associated pulse correspond in time. For example, if the speech signal as shown in curve A of FIG. 3 were applied directly to the TASI switch, the resulting TASI switch output would be as illustrated by curve G of FIG. 3. The desired duration of transmission is the interval $t6$—$t11$ whereas the actual transmission interval would be $t8$—$t11$. Initial clipping to the degree illustrated, i.e. during the period $t6$—$t8$, would distort the transmitted speech to the point of seriously impairing its quality. Consequently, in accordance with the invention, speech signals are applied to the TASI switch, by the conducting path shown, only after the signals have been delayed by the delay circuit $\Delta t$. Instead of applying the speech signal to the switch during the period $t5$—$t11$ as shown in curve A, the $t7$—$t13$ interval of curve C is employed. As a result the speech actually transmitted is applied to a transmission channel during the interval $t8$—$t13$, as shown in curve H, which is equal to the period $t6$—$t11$ of curve A.

Also illustrated by curve H is the effect of the hangover feature of the gate pulse generator since the speech tail $t9$—$t11$ as shown in curve A or $t10$—$t13$ as shown in curve C is of course included within the $t8$—$t13$ transmission.

The invention described thus far provides adequate protection against false operation of the TASI switch by noise spurts, but the problem of false operation by echoes remains. Mention has already been made of the echo phenomenon which occurs in transmission systems and of the function performed by an echo suppressor in overcoming the problems introduced by such echoes. An echo suppressor is designed with a particular threshold so that signals on the receiving line, whether speech from the far end or echoes from the near end talker, must exceed a preselected amplitude before the suppressor is operated. Depending upon the relative threshold levels of an echo suppressor and a speech detector in a particular system, it is possible for certain weak echoes on the receiving line to come around the hybrid and operate the speech detector without operating the echo suppressor. Additionally, a speech detector is normally faster in operation than its associated echo suppressor and the leading edge of even a strong received signal may pass through the echo suppressor circuit and operate the speech detector before the echo suppressor has time to operate. Referring to FIG. 1 in the light of these known principles, it is apparent that an echo on the receiving line which is passed through the echo suppressor by way of the hybrid H without operating the differential feature of the echo suppressor may eventually falsely operate both speech detectors A and B. Signal selectivity on the basis of signal duration is of course insufficient to distinguish between speech and echoes.

In order to avoid false operation of the speech detectors by echoes, a feature of the invention provides a conducting path from the receiving line at point Q on the hybrid side of the echo suppressor to a speech gate D. Gate D may be any one of a variety of conventional gates comprising, for example, semiconductor or electron discharge devices which provide a low impedance path in the direction of the small arrows in the absence of an inhibit signal from the gate pulse generator. The output of the gate D is in turn applied to speech detector C whose output is thence fed to gate E. Gate E may be of conventional design similar to gate D, providing a low impedance path between the amplifier and speech detector A in the absence of an inhibiting pulse in the form of an output signal from speech detector C. Consequently, echoes which might otherwise falsely operate the TASI switch, thereby decreasing the efficiency of the entire system, are employed in accordance with the invention to give positive assurance against such false operation. Additionally, the gate inhibiting path between the gate pulse generator and gate D ensures against interference or interruption of normal speech detector operation by echoes.

A variant in the arrangement described may be employed, within the scope of the invention, by connecting gate D to the receiving line directly from point R, instead of from point Q, on the opposite side of the echo suppressor. The connection from point Q is considered preferable, however, since a connection from point R would tend to make speech detector C assume the differential function of the echo suppressor. With the connection to the receiving line made at point Q, however, the echo suppressor is allowed to function normally before any signal is applied to speech detector C.

Figure 2:
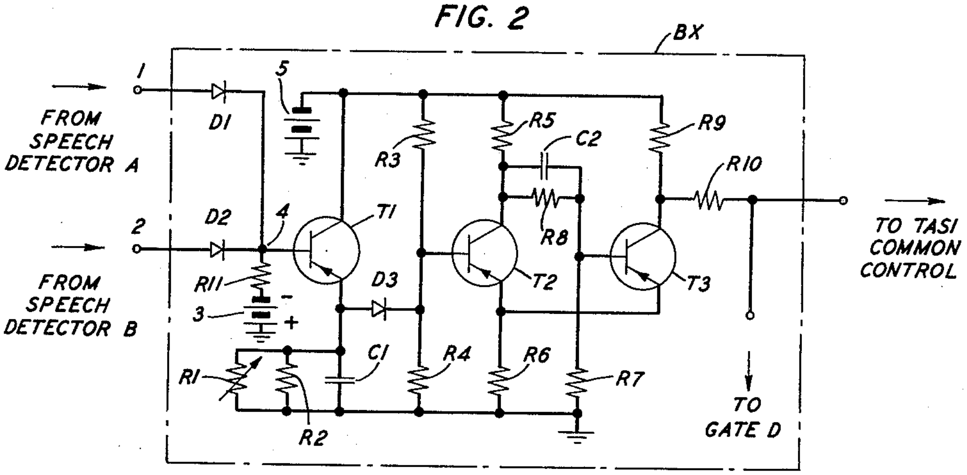
FIG. 2 is a schematic circuit diagram of a designated part of FIG. 1.

Turning now to a more detailed consideration of a part of the circuitry of the illustrative embodiment, FIG. 2 shows a schematic circuit diagram of the apparatus included within the dotted line box BX of FIG. 1. The AND gate comprises input points 1 and 2 which receive output pulses from speech detectors A and B, respectively, a pair of diodes D1 and D2, a biasing source 3, and a load resistor R11. The output of the AND gate is applied to a gate pulse generator circuit comprising a transistor switch T1 together with its associated circuit elements, variable resistor R1, fixed resistor R2, capacitor C1, diode D3, and biasing source 5. Additionally, the gate pulse generator includes a monostable multivibrator or trigger circuit comprising transistor T2 and its associated resistors R3 through R6 and R8 and capacitor C7 together with transistor T3 and its associated resistors R7, R9, and R10.

In the quiescent state, that is to say in the absence of speech signals, diodes D1 and D2 are biased in the forward direction by the potential source 3, and the current flowing through these diodes also flows through resistor R11 which serves to maintain junction point 4 at a particular fixed negative potential. A negative pulse from either speech detector A or B alone has substantially no effect on the established potential of point 4 since one of the diodes, D1 or D2, remains in a conducting state. In the case of overlapping pulses, however, both diodes are biased in the reverse or nonconducting direction and the potential at point 4, or the base of transistor T1, immediately drops to a level which is sufficient to place a forward bias on the emitter-base junction of transistor T1, thereby turning T1 On.

As long as transistor T1 is Off the plate of diode D3 is positive with respect to its cathode and diode D3 is therefore held in a conducting state. In this condition the base of transistor T2 is maintained sufficiently positive to keep transistor T2 in a conducting state. Under these circumstances transistor T3 is also conducting. With transistor T1 turned On, however, diode D3 is changed to its high impedance state, the base voltage of T2 is decreased, and T2 is partially turned On. Transistor T3 is then turned Off since its base potential is increased through the coupling of capacitor C2 and resistor R8 to the collector of transistor T2. The direct coupling between the emitter of transistor T3 and the emitter of transistor T2 drives T2 fully On.

The switching of transistor T3 to a nonconducting or Off state produces an output pulse for application to the TASI common control circuit and a gate D. The duration of this output pulse is governed by the time that diode D3 remains in its nonconducting state which in turn depends, in part, on the period during which transistor T1 is turned On. However, as a result of the characteristic exponential delay in the discharge of the resistance-capacitance combination comprising variable resistor R1, fixed resistor R2, and capacitor C1, the voltage on the plate of diode D3 remains sufficiently negative with respect to its cathode to keep it in its nonconducting state for a preselected interval of time, the hangover period, after transistor T1 turns Off. The end result is that the output pulse from transistor T3 is prolonged for the duration of the hangover period so that it exceeds the duration of the AND gate output pulse.

It is to be understood that the above-described arrangements are illustrative of the application of the principles of this invention. Numerous other arrangements may be designed by those skilled in the art without departing from the spirit and scope of the invention.

What is claimed is:

1. In a time assignment speech interpolation system including a plurality of talkers' lines, at least one of said lines having applied thereto speech signals of a first predetermined average duration and noise signals of a second predetermined average duration less than said first duration and a corresponding plurality of receiving lines, in combination, first means responsive to said signals on said one of said talker's lines above a preselected amplitude for generating a corresponding first output signal, second means responsive to said signals on said one of said talkers' lines above said preselected amplitude for generating a second corresponding output signal delayed in time with respect to said first signal by an interval greater than said second duration and less than said first duration, means responsive to a time overlap between said first and said second output signals for generating a control signal, thereby enabling said system to distinguish between speech signals and noise signals on a combined basis of signal amplitude and signal duration, means responsive to said control signal for connecting said one of said talkers' lines to one of said transmission channels, first means responsive to signals on that one of said receiving lines which corresponds to said one of said talker's lines for disabling one of said output signal generating means, and second means responsive to said control signal for disabling said first disabling means.

2. Apparatus as defined in claim 1 wherein said first and second output signal generating means comprise, respectively, a first and a second speech detector and wherein said second output signal generating means further includes delay means connecting said talker's line to the input of said second speech detector.

3. In a time assignment speech interpolation system including a plurality of talkers' lines, at least one of said lines having applied thereto speech signals of a first predetermined average duration and noise signals of a second predetermined average duration less than said first duration and a corresponding plurality of receiving lines, in combination, first means responsive to said signals on said one of said talker's lines above a preselected amplitude for generating a corresponding first output signal, second means responsive to said signals on said one of said talker's lines above said preselected amplitude for generating a second corresponding output signal delayed in time with respect to said first signal by an interval greater than said second duration and less than said first duration, means responsive to a time overlap between said first and second output signals for generating a control signal, thereby enabling said system to distinguish between speech signals and noise signals on a combined basis of signal amplitude and signal duration, means responsive to said control signal for connecting said one of said talker's lines to one of said transmission channels, first means responsive to signals on that one of said receiving lines which corresponds to said one of said talker's lines for disabling one of said output signal generating means, second means responsive to said control signal for disabling said first disabling means, said first and second output signal generating means including, respectively, a first and a second speech detector, said first output signal generating means further including delay means connecting said talker's line to the input of said second speech detector, said first disabling means including means connecting said talker's line to the input point of said first speech detector through a first speech gate, providing thereby a normally low impedance path for input signals to said first speech detector, a third speech detector, means connecting said receiving line to the input point of said third speech detector through a second speech gate, and means for applying the output of said third speech detector to said first speech gate, thereby to inhibit said gate.

4. Apparatus as defined in claim 3 wherein said second disabling means comprises means for applying said control signal to said second speech gate thereby to inhibit said gate.

5. In a communication system including a plurality of talkers' lines, an equal plurality of receiving lines and a lesser plurality of transmission channels, apparatus associated with a corresponding one of each of said talkers' lines and its related receiving line comprising, in combination, first means including a first speech detector responsive to a signal on said talkers' line exceeding a preselected amplitude for generating a first output pulse equal in duration to said signal, second means including a second speech detector in parallel relation to said first means responsive to said signal for generating a second output pulse equal in duration to said first output pulse at a first preselected time interval after said first output pulse, means connecting said receiving line to the input point of said second speech detector, said connecting means including a delay network for delaying the transmission of signals from said receiving line to said second speech detector by a period equal to said first preselected time interval, means responsive to an overlap in time between said first and second output pulse for generating a third output pulse equal in duration to said first and second pulses, means responsive to said third output pulse for generating a control pulse exceeding the duration of said output pulses, and means responsive to said control pulses for connecting said talkers' line to one of said transmission lines.

6. Apparatus as defined in claim 5 wherein said third output pulse generating means comprises an AND gate and means responsive to the output of said AND gate for prolonging said first output pulse by an increment of time equal to said first preselected time interval.

7. Apparatus as defined in claim 6 wherein said pulse prolonging means comprises a feedback path from the output point of said AND gate to said first speech detector.

8. Apparatus as defined in claim 5 wherein said control pulse generating means comprises a gate pulse generator.

9. In a two way communication system including a talker's line, a receiving line and a plurality of communication channels, in combination, means for applying signals from said talker's line to a pair of parallel paths, one of said paths including a first normally low impedance gate device and a first speech detector in series relation and the other of said paths including a delay network and a second speech detector in series relation thereby to introduce a preselected delay in the transmission of signals from said talker's line to the input of said second speech detector, means for applying the output pulses of said speech detectors to an AND gate, whereby said AND gate generates an output pulse whenever the duration of a pair of corresponding input pulses exceeds the duration of said preselected delay, means for applying the output pulse of said AND gate to a gate pulse generator, whereby said generator produces a control pulse of a duration which exceeds the duration of said AND gate output pulse by a preselected time increment, and means responsive to said control pulse for connecting said talker's line to said receiving line for a period equal to the duration of said control pulse.

10. Apparatus as defined in claim 9 including means responsive to signals on said receiving line for inhibiting said first gate device thereby to prevent the false operation of said speech detectors by echoes.

11. Apparatus as defined in claim 10 wherein said inhibiting means comprises a second normally low impedance speech gate and a third echo suppressor in series relation connected between a point on said receiving line and said first speech gate thereby to employ the output of said third speech detector to inhibit said first gate.

12. Apparatus as defined in claim 11 including means connecting the output point of said gate pulse generator to said second gate whereby said second gate is inhibited by said control pulse, thereby to prevent disabling said first and second speech detectors during periods of speech transmission.

13. Apparatus as defined in claim 11 including an echo suppressor bridged across said talker's line and said receiving line, said point on said receiving line being on the output side of said echo suppressor, thereby to supplement the normal function of said echo suppressor.

References Cited in the file of this patent

UNITED STATES PATENTS

| | | |
|---|---|---|
| 2,541,932 | Melhose | Feb. 13, 1951 |
| 2,629,020 | Robertson | Feb. 17, 1953 |
| 2,777,059 | Stites | Jan. 8, 1957 |
| 2,851,598 | Ostergren et al. | Sept. 9, 1958 |
| 2,885,590 | Fuller | May 5, 1959 |